Nov. 2, 1965  R. W. KETCHLEDGE  3,215,989
OPTICAL APPARATUS FOR COORDINATE SELECTION
Filed Dec. 20, 1963  3 Sheets-Sheet 1
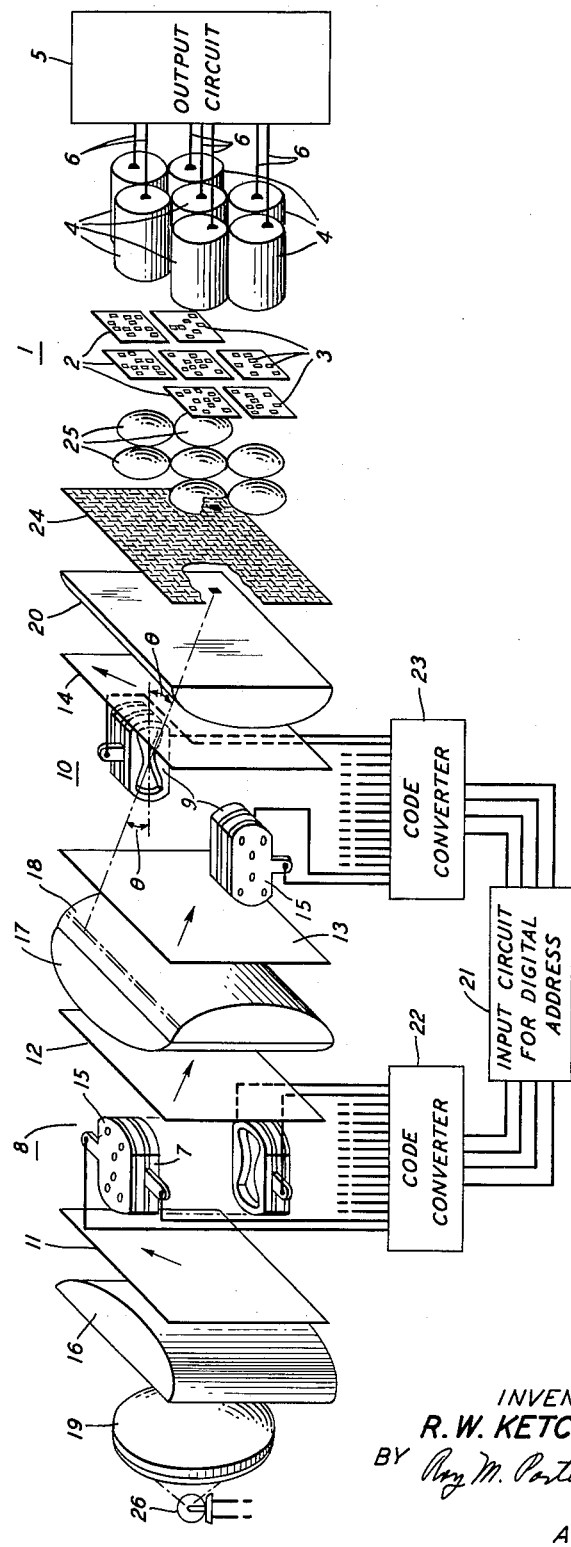
INVENTOR
R. W. KETCHLEDGE
BY
ATTORNEY

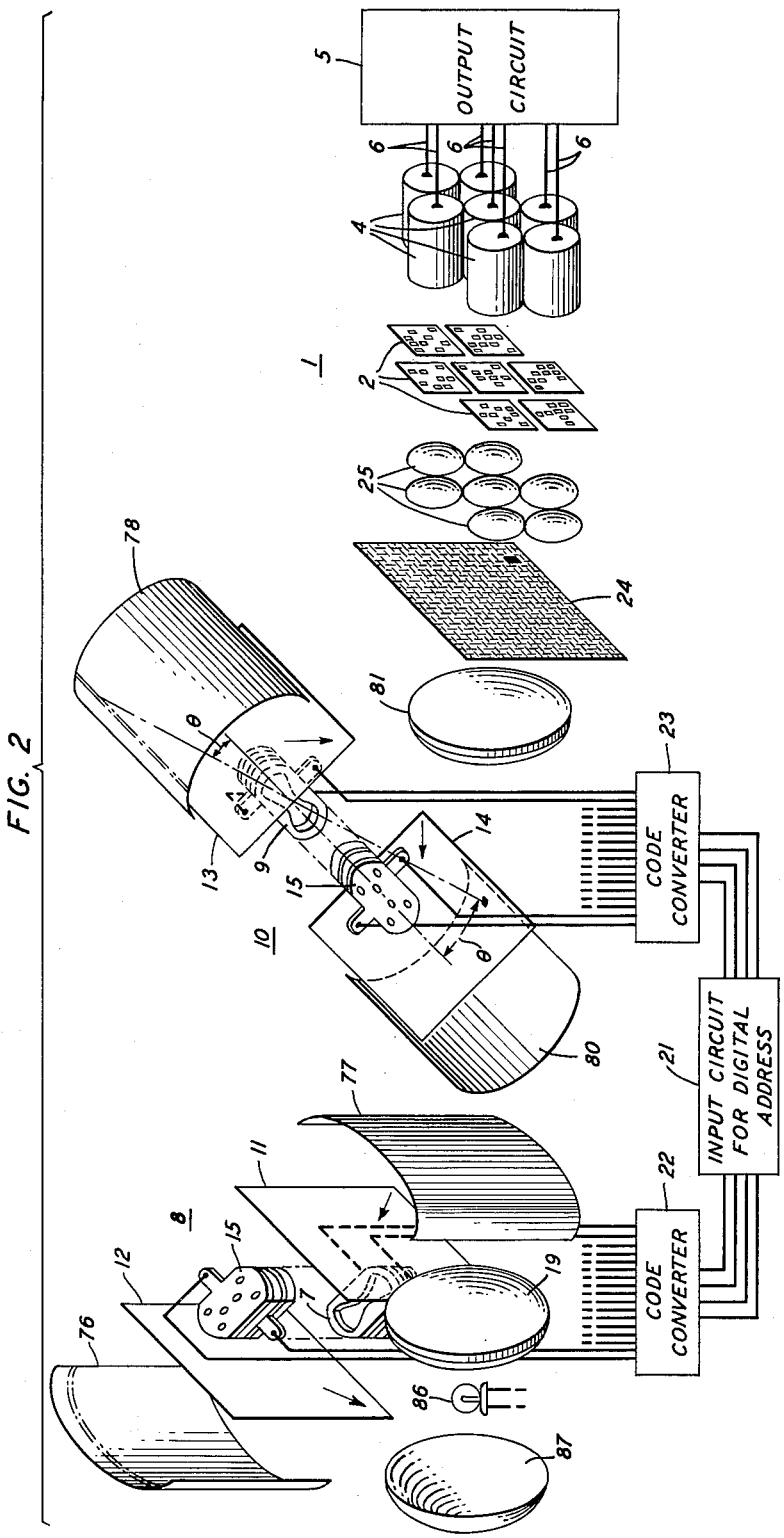

United States Patent Office

3,215,989
Patented Nov. 2, 1965

3,215,989
OPTICAL APPARATUS FOR COORDINATE SELECTION
Raymond W. Ketchledge, Rumson, N.J., assignor to Bell Telephone Laboratories, Incorporated, New York, N.Y., a corporation of New York
Filed Dec. 20, 1963, Ser. No. 332,149
13 Claims. (Cl. 340—173)

This invention relates to apparatus in which multiple segment polarization modulators are alternately cascaded with crossed polarizing filters to transmit portions of an electromagnetic wave to selected coordinate locations in a photosensitive information storage matrix and further relates to the construction of such modulators.

In prior art versions of such apparatus, driving signals are applied to elongated vertical and horizontal coordinate-selecting modulator segments. While the elongation has been found necessary to provide that vertical coordinate-selecting segments overlap horizontal coordinate-selecting segments in the path of the beam, the elongated segments must be driven with excessive amounts of power. This problem grows more acute as the speed of the apparatus and the number of possible storage locations are increased.

It is therefore an object of this invention to reduce the power required to drive polarization modulator segments in such a coordinate selection apparatus.

It is a further object of the invention to provide a novel structure and method of construction for multiple-segment polarization modulators.

A still further object of the invention is to improve both the efficiency and information storage capacity of a large capacity random access memory in which coordinate selection is accomplished by partial transmission of a beam of polarized electromagnetic wave energy.

In accordance with the present invention, modulator segment elongation is eliminated; and cylindrically curved means for focusing the incident portion of the wave upon all of the segments of the subsequently cascaded modulator provide the effect of an overlap in the path of the beam. Modulator segment driving power is thereby drastically reduced. Specifically, the location coordinate selected by one segmented modulator is converted by the focusing means to a corresponding angle of the transmitted rays with respect to a reference plane through the next segmented modulator.

According to a feature of the invention, each modulator segment has opposed cylindrically curved surfaces that complement the preceding cylindrically curved focusing means by providing equal traverse distances for all rays of the transmitted portion of the wave. The transmitted rays may consequently be focused with increased resolution; and multiple-channel coordinate selection is thereby made feasible.

According to still another feature of the invention, the modulators are constructed by a method including the steps of flattening glass tubing to have opposed cylindrically curved surface sectors, segmenting the tubing along the axis thereof, laminating the tubing by inserting flat electrode plates between the segments, fusing the assembly, and filling it with electro-optically active liquid such as nitrobenzene.

Further features and advantages of the invention will become apparent from the following detailed description in conjunction with the drawing, in which:

FIG. 1 is a partially pictorial and partially block diagrammatic illustration of a preferred embodiment of the invention;

FIG. 2 shows modifications of the embodiment of FIG. 1 employing cylindrically curved mirrors;

Figure 4:
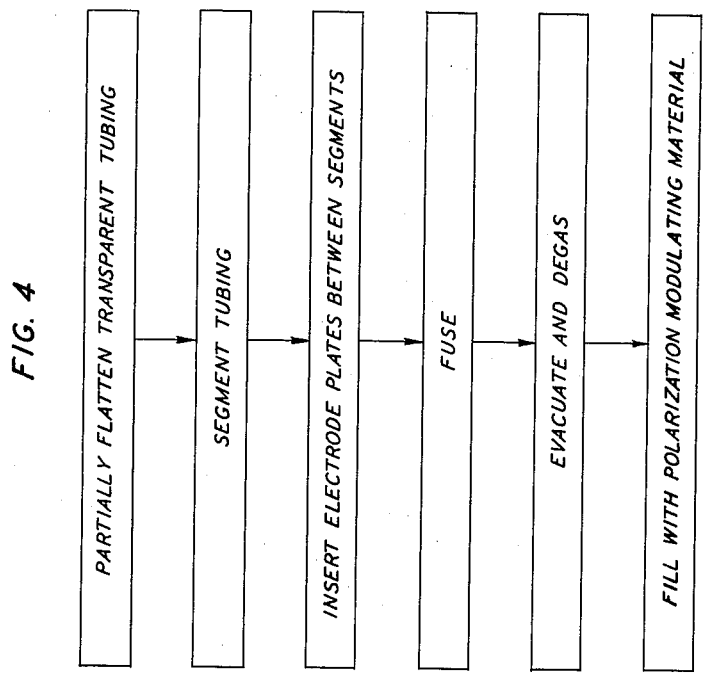
FIG. 4 is a block diagram chart outlining the process of constructing segmented modulators.

Information storage matrix 1, as shown in the drawing, comprises units or slides 2 having the substantially transparent regions 3. The irregular alternation of transparent regions 3 with intervening opaque regions represents information previously stored in slides 2. That is, in a binary information storage scheme, a transparent region may represent a "1" and an opaque region may represent a "0." The slides 2 preferably are developed photographic plates, but might also be punched cards.

A portion of a beam of radiant energy, shown at the left in the drawing, is to be directed at corresponding positions, or coordinate locations, in each of the slides 2. The photomultipliers 4, which are photosensitive or light-detecting devices well known in the art, will each produce a pulse when the irradiated portion of its corresponding slide 2 is transparent, but not when that portion is opaque. Thus, the output circuit 5 will receive simultaneous pulses in groups of zero to seven in various patterns on its input leads 6. It is commonly said in the art that such an output circuit 5 receives stored information a word at a time, and that the apparatus associated with the information storage matrix 1 has multiple information storage channels. Output circuit 5 may comprise any circuit for utilizing binary-coded information.

Within each channel, the position of its portion of the beam, and hence the irradiated coordinate location in each slide 2, is determined by the electrical signals applied to the segments 7 of a polarization modulator 8 inserted between crossed polarizers 11 and 12 and by the electrical signals applied to the segments 9 of a polarization modulator 10 inserted between crossed polarizers 13 and 14. The specific structures and method of construction of modulators 8 and 10 are discussed in more detail hereinafter in reference to FIG. 3 and FIG. 4.

It may be seen that the planes of polarization of polarizers 12 and 13 are orthogonal to, or in polarization quadrature with, the planes of polarization of polarizers 11 and 14. Polarizing filters 12 and 13 are said to be crossed with respect to polarizing filters 11 and 14. Polarizing filters 11 through 14 are preferably either Polaroid sheets or Nicol prisms. The radiant energy of the beam can pass through crossed polarizers 11 and 12 only where its polarization is modulated by a segment 7. Polarizer 12 blocks unmodulated radiation. The modulation may include rotating the linear polarization provided by polarizer 11 through a limited angle or may include making the polarization elliptical, i.e., continuously rotating at the characteristic frequency of the radiant energy. Similarly, the radiant energy of the beam can pass through crossed polarizers 13 and 14 only where its polarization is modulated by a segment 9. Polarizer 14 blocks unmodulated radiation. If lenses 17 and 18 are sufficiently stress free to not disturb the polarization established by polarizer 12, polarizer 13 may be omitted.

According to the invention, the lenses 16 and 18 focus the incident rays of the beam in a thin ribbon upon the modulators 8 and 10 respectively, so that any segment 9 may effectively overlap any segment 7. Specifically, the vertical coordinate selected by modulator 8 is converted by lens 18 to a corresponding angle of the transmitted rays with respect to a reference plane through the common curvature axis of the segments 9 of modulator 10.

This cooperation may be described in detail as follows. The beam of radiant energy, which is divergent to some degree, is collected and collimated as much as possible by the convex converging lens 19. Cylindrical lens 16 has a vertical axis of curvature and forms the beam into a vertical ribbon beam that irradiates all the segments 7 of modulator 8. The segments 7 have a common vertical axis of curvature that lies at the focus of cylindrical lens 16.

Only one of the segments 7 is driven or energized by an electrical signal, for example, the segment 7 that is the second from the top. Consequently, a portion of the radiant energy passing through that segment 7 will be able to pass through polarizer 12. The rays emerging from polarizer 12 are diverging. The diverging rays irradiate a thin horizontal strip of cylindrical lens 17, which also has a vertical axis of curvature. Since the axis of curvature of modulator 8 lies at the focus of cylindrical lens 17, lens 17 recollimates the rays as a thin ribbon.

It may be noted that the height of the irradiated strip of lens 17 is directly related to which modulator segment 7 was driven. Regardless of that height, cylindrical lens 18, which has a horizontal axis of curvature, focuses the rays at the common horizontal axis of curvature of the segments 9 of the modulator 10. It may be seen that the rays strike modulator 10 at an angle $\theta$ with respect to a reference plane passing through the axis of modulator 10, $\theta$ being directly related to which modulator segment 7 was driven.

Only one of the segments 9 is driven or energized by an electrical signal, for example, the segment 9 that is the third from the left. Consequently, a portion of the radiant energy passing through that segment 9 will be able to pass through polarizer 14. The rays emerging from polarizer 14 continue to travel downward at the angle $\theta$ and irradiate a spot on cylindrical lens 20. The vertical position of this spot will be related to which segment 7 was driven, the topmost segment 7 producing the lowest spot, and vice versa. The horizontal position of the spot is directly related to which segment 9 was driven.

The cylindrical lens 20 has a horizontal axis of curvature. Since the modulator 10 lies at its focus, it will direct the incident rays horizontally, regardless of the angle $\theta$ of incidence. Thus, the rays strike the lenticular screen 24 at a position having the same horizontal and vertical coordinates as the spot on lens 20. While lens 20 is not a necessary element of the invention, it aids visualization of the relationships involved.

Lenticular screen 24 is a translucent optical projection screen of the type disclosed in R. A. Bull et al. Patent No. 1,970,358, issued Aug. 14, 1934. Lenticular screen 24 diffuses parallel light rays incident upon it from lens 20 through a large solid angle to provide converging lenses 25 with substantially equal amounts of radiation. It is noted that some divergence of the rays might be obtained in the vertical direction at a point preceding screen 24 merely by omitting cylindrical lens 20. In that case, the minute lens-like elements of screen 24 are designed to give greater diffusion in the horizontal direction than in the vertical direction. In either case, a large number of the minute lens-like elements of screen 24 should intercept the thin pencil of rays incident thereon. Furthermore, the dimensions of each lens-like element should be small compared to the dimensions of each information storage region 3 in output matrix 1.

Other possible constructions for a screen such as lenticular screen 24 are well known in the field of stereoscopic projection apparatus. A basic requirement for screen 24 is that its diffusion be predominantly confined within a solid angle that is subtended by the lenses 25. Each of the converging lenses 25 intercepts a portion of the diverging rays and causes that portion to converge toward its corresponding information storage slide 2. Moreover, each portion of the rays will converge toward a particular coordinate location on its corresponding slide 2, that coordinate location being determined by the coordinate location in screen 24 from which the rays emerged. Specifically, rays from the top or bottom coordinate locations in screen 24 irradiate bottom or top coordinate locations in each slide 2, respectively. Rays from left-hand or right-hand coordinate locations in screen 24 irradiate right-hand or left-hand coordinate locations in each slide 2, respectively.

Thus, the particular coordinate locations illuminated in each slide 2 are identifiable in a one-to-one relationship with the particular combinations of one driven segment 7 and one driven segment 9. The signals that drive these segments may therefore be called information address signals. Input circuit 21 provides a different information address signal for each coordinate location in an information storage slide 2. In the preferred embodiment shown in FIG. 1, input circuit 21 supplies a digital signal of the binary coded type commonly provided by a digital computer; input circuit 21 may in fact be a digital computer. Code converter 22 converts part of the binary coded signal from circuit 21 into a binary signal applied to just one of the segments 7. Code converter 23 similarly converts the other part of the binary signal from input circuit 21 into a binary signal applied to just one of the segments 9 of modulator 10. Thus, an ordinary n-digit binary code is converted to a one-out-of-$2^n$ digits type of binary code.

A segment 7 or 9 is energized by a voltage difference applied by an output of converter 22 and 23 to the electrodes 15 at each end of that segment. If, for example, the segment 7 that is the second from the top is energized, all electrodes 15 above that segment are given one voltage, such as six volts (6 v.), and all the electrodes 15 below that segment are given another voltage, such as zero volts (0 v.). Code converters 22 and 23 may be constructed by techniques well-known in the data translation art by following the preceding specifications.

Figure 3:
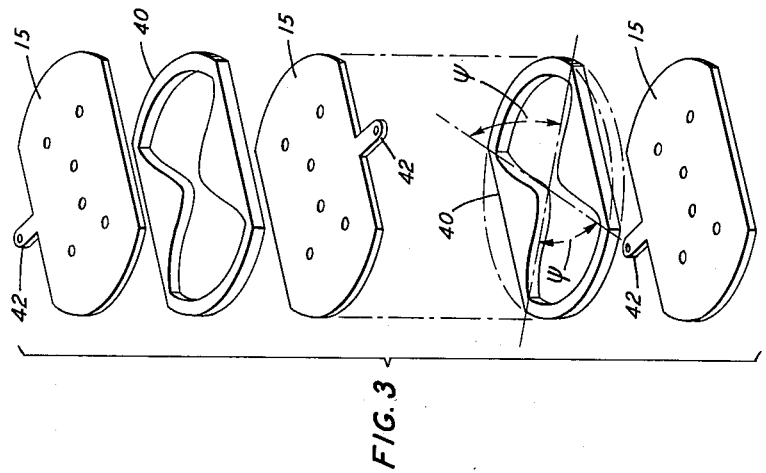
FIG. 3 is a pictorial showing of structural details of a preferred form of the modulator segments.

FIG. 3 shows the structure of modulator segments 7 and 9 of modulators 8 and 10, according to a feature of the invention which provides equal traverse distances for all rays focused at the curvature axes of modulators 8 and 10 regardless of the angles of convergence of the incident rays.

The walls of segments 7 and 9 of FIG. 1 comprise the glass spacers 40 shown in FIG. 3. The spacers 40 have cylindrically curved surface sectors throughout the portions thereof that are intended to be adjacent to the polarizing filters. The opposed sectors of a spacer 40 have a common axis of curvature that is perpendicular to the planes defined by the open ends of the spacer. The angle $\psi$ subtended by the curved sectors is sufficient in relation to the focal lengths and the cylindrical cross-section widths of lenses 16 and 18 to transmit all incident rays through the opposed curved sectors to provide equal traverse distances regardless of the angles of convergence of the incident rays. The remaining portion of each spacer 40 comprises flat outside walls in order to reduce the driving power requirements of each segment 7 and 9. In other words, reduction of the lateral dimension means that less polarization modulating material is required within each segment 7 and 9.

Electrodes 15 are about 1 mil (0.001 inch) thick and are given the same outside shape and lateral dimensions as the spacers 40, except for the external connector tabs 42. When the electrodes 15 are assembled between the spacers 40, the tabs 42 protrude beyond the flat walls of spacers 40 on alternately opposed sides in order to facilitate connection of the output leads of code converters 22 and 23 of FIG. 1 with a minimum of electrical capacitance between those leads. It is noted that the electrodes 15, as assembled with spacers 40, intersect the curvature axes of adjacent spacers perpendicularly.

Electrodes 15 are provided with small holes that allow filling of the segments 7 and 9 with nitrobenzene after the modulators 8 and 10 are otherwise assembled.

The assembly method, according to a feature of the invention, is as tabulated in FIG. 4, and may be more specifically described as follows.

(1) Flatten glass tubing to have opposed cylindrically curved surface sectors. As in familiar tecnniques in the glass-making art, the sides to be flattened should be heated. Care should be taken to prevent change in the radius of curvature of the curved sectors within the angles $\psi$.

It is noted that the flattening process will cause some glass in the flattened walls to intrude into the cavity of the tube. This is permissible, and even desirable, so long as the glass does not intrude within the angles $\psi$. The intrusions further reduce the amount of polarization modulating material required and the power required to drive it, without interfering with the operation of modulator segments 7 and 9.

(2) Segment the glass tubing at periodic intervals along the axis of the tubing. This is preferably done by sawing entirely through the tubing to obtain the glass spacers 40. Although the spacers or segments are preferably 9 mils (0.009 inch) thick, or as thin as is feasible in practice, other thicknesses might be used. It is understood that tubing of any substantially transparent isotropic material might be used.

(3) In an assembly jig, assemble the modulator casing by inserting the flat electrode plates 15 between the segments or spacers 40, alternating tabs 42 on opposite sides. End caps may be added as a part of this step, if one cap is adaptable to permit subsequent evacuation and filling.

(4) Heat the modulator casing to fuse the segments and plates. This may preferably be done while the modulator casing is still in the assembly jig. Here again, care must be taken to prevent change in the radius of curvature of the curved sectors of spacers 40 within the angles $\psi$.

(5) Evacuate and degas the modulator casing. As is common in the vacuum tube art, a vacuum pump may perform part of the evacuation and degasing, while a so-called "getter" material within the casing can remove the final traces of gas.

(6) Fill the modulator casing by feeding pure nitrobenzene through the holes in electrode plates 15. The modulator casing is preferably held with its curvature axis vertical; and the nitrobenzene is allowed to flow by gravity through the holes in electrode plates 15 to fill the internal cavities of all the spacers 40. A variety of other electrically or magnetically responsive polarization-modulating materials might be injected into spacers 40 instead of nitrobenzene. Nitrobenzene produces the so-called Kerr electro-optic effect under the influence of an electric field. Other materials might produce other effects, which nevertheless modulate polarization of incident radiation.

(7) Seal the ends of the assembled modulator. If end caps have been provided, the uppermost one through which filling was accomplished is now tightly sealed.

Regardless of the method of construction, segments 7 and 9 should be given curved optical surfaces that complement the focusing means 16 and 18 in reducing driving power and in improving resolution at information storage matrix 1 by reducing aberrations within modulators 8 and 10.

FIG. 2 illustrates that the inventive cooperation of FIG. 1 may be achieved with cylindrically curved mirrors 76, 77 and 78 as with lenses 16, 17 and 18, respectively. The curvature axes of mirrors 76 and 77 are coplanar, and preferably parallel, with the common curvature axis of the segments 7 of modulator 8; and the curvature axes of mirrors 78 and 80 are coplanar, and preferably parallel, with the common curvature axis of segments 9 of modulator 10. Objective lens 81 serves to produce a more sharply focused spot on lenticular screen 24. The minute, lens-like elements of screen 24 are still sufficiently small that a large number of them intercept the incident rays from lens 81. Mirror 80 may be eliminated if lenticular screen 24 compensates by greater horizontal than vertical diffusion as explained above for the embodiment of FIG. 1. Mirrors 76 and 78 may be combined into a single double-curved surface according to techniques familiar in the optical art.

According to the characteristic cooperation of the invention, the vertical position selected by modulator 8 is converted by mirror 78 into a corresponding angle of the reflected ribbon of rays with respect to a reference plane passing through the horizontal axis of the modulator 10. Thus, rays of the beam of radiant energy will finally strike lenticular screen 24 at vertical and horizontal coordinates which correspond to particular driven segments 7 and 9, respectively, in the manner described above for the embodiment of FIG. 1.

The remainder of the system following lenticular screen 24 is the same as in the embodiment of FIG. 1. Likewise, the arrangements for driving selected segments 7 and 9 are the same as in the embodiment of FIG. 1.

Mirrors 76, 77 and 78, as contrasted to lenses 16, 17 and 18, permit shorter focal lengths, thereby reducing path length and time delay. Mirrors also reduce chromatic aberrations and permit wider convergence and divergence angles of the rays, thereby reducing light loss. Moreover, the wider angles permit larger overall dimensions at the output matrix 1, thereby increasing the capacity or quantity of information storage.

In all cases it is understood that the above-described arrangements are illustrative of a small number of the many possible specific embodiments that can represent applications of the principles of the invention. Numerous and varied other arrangements can readily be devised in accordance with these principles by those skilled in the art without departing from the spirit and scope of the invention.

What is claimed is:

1. Information storage apparatus of the type comprising at least one information storage unit, a plurality of polarizing filters, a first polarization modulator disposed between two crossed ones of said polarizing filters, said first modulator having a plurality of segments that may be driven to select a first location coordinate in said information storage unit, a second polarization modulator disposed between two crossed ones of said polarizing filters in a position between said first modulator and said information storage unit, said second modulator having a plurality of segments that may be driven to select a second location coordinate in said information storage unit, said apparatus being particularly characterized by a first cylindrically curved means for focusing an electromagnetic wave upon all of said segments of said first modulator, a second cylindrically curved means for focusing rays of said wave that are polarization modulated in said first modulator upon all of said segments of said second modulator, the angle that said rays form with respect to a reference plane through said second modulator corresponding to said first location coordinate.

2. Apparatus for transmitting a portion of a beam of radiant energy to selected locations in an optically sensitive information storage matrix, comprising said information storage matrix, a first polarizing filter having a first plane of polarization, a second polarizing filter having a second plane of polarization in quadrature with said first plane, a third polarizing filter having a third plane of polarization in quadrature with said second plane, a first set of polarization modulating elements disposed between said first and second filters, said elements in first set having cylindrically curved surfaces and a first common axis of curvature, said elements in said first set having electrodes disposed to impose a modulating field along said first axis within any one of said elements of said first set, a first means for focusing said beam along said first axis, a second set of polarization modulating elements disposed between said second and third filters, said elements in said second set having cylindrically curved surfaces and a second common axis of curvature, said elements in said second set having electrodes disposed to impose a modulating field along said second axis within any one of said elements of said second set, a second means for focusing rays that are modulated by said first set of elements along said second axis to effect an overlap of said first and second sets of elements in the path of said beam.

3. Apparatus according to claim 2 in which the first focusing means comprises a first lens having a first axis of curvature that is coplanar with the first common axis of the first set of modulating elements and the second focusing means comprises a second lens having a second axis of curvature that is coplanar with the second common axis of the second set of modulating elements.

4. Apparatus according to claim 2 in which the first focusing means comprises a first mirror having a first axis of curvature that is coplanar with the first common axis of curvature of the first set of modulating elements and the second focusing means comprises a second mirror having a second axis of curvature that is coplanar with the second common axis of curvature of the second set of modulating elements.

5. Information storage apparatus according to claim 2 in which the information storage matrix includes a plurality of information storage units, said apparatus including a lenticular optical projection screen disposed between the second modulator and said storage units to diffuse rays transmitted by said second modulator throughout a solid angle, and a plurality of means for focusing said diffused rays simultaneously upon said units at corresponding first and second location coordinates in each of said units, said plurality of focusing means subtending said solid angle.

6. Apparatus comprising a plurality of information storage units, each of said units having a plurality of regions that are substantially opaque to a beam of electromagnetic wave energy and a plurality of regions that are substantially transparent to said beam, a source of said beam, a plurality of photosensitive elements each disposed to respond to portions of said beam transmitted through said transparent regions of one of said storage units, a lenticular optical projection screen disposed between said source and said uints, a plurality of converging lenses each disposed between said screen and one of said units, a first polarizing filter having a first plane of polarization, a second polarizing filter having a second plane of polarization in quadrature with said first plane, a third polarizing filter having a third plane of polarization in quadrature with said second plane, said first, second and third filters being disposed between said source and said screen, a first polarization modulator disposed between said first and second filters, said first modulator having opposed cylindrically curved surface sectors and a first common axis of curvature for said surface sectors, said first modulator having plates that intersect said first axis and segment said first modulator, a second polarization modulator disposed between said second and third filters, said second modulator having opposed cylindrically curved sectors and a second common axis of curvature for said surface sectors, said second modulator having plates that intersect said second axis and segment said second modulator, a first cylindrically curved means for focusing said beam from said source along said first axis of said first modulator, said first focusing means having a third axis of curvature that is parallel to said first axis of said first modulator, and second cylindrically curved focusing means for focusing rays transmitted by said second filter along said second axis of said second modulator, said second focusing means having a fourth axis of curvature that is parallel to said second axis of said second modulator.

7. Apparatus according to claim 6 in which each one of the plates has at least one hole through said one plate.

8. Wave translation apparatus comprising a target for radiant wave energy, means for polarizing said radiant wave energy, cylindrically curved means for focusing said radiant wave energy, means for modulating adjacent portions of said polarized focused energy differently, means for repolarizing one modulated portion of said energy, cylindrically curved means for refocusing said one modulated portion of said energy, means for remodulating adjacent portions of said repolarized refocused energy differently, and means for transmitting one remodulated portion of said energy to said target more strongly than an adjacent one of said remodulated portions.

9. Wave translation apparatus comprising a target for radiant wave energy, means for polarizing said radiant wave energy, cylindrically curved means for focusing said radiant wave energy along a first line, means for modulating said polarized focused energy, said modulating means having a plurality of segments disposed along said first line, means for repolarizing said energy modulated by one of said segments, cylindrically curved means for refocusing said modulated energy along a second line, said first and second lines being projectable on said target as first and second coordinates, means for remodulating said repolarized refocused energy, said remodulating means having a plurality of segments disposed along said second line, and means for transmitting said remodulated energy to said target more strongly than the remainder of said repolarized refocused energy.

10. Wave translation apparatus according to claim 9 in which the modulating segments and the remodulating segments include isotropic housings and modulating materials within said housings, said housings being cylindrically curved about the respective first and second lines to the limits of the respective angles subtended by the focusing means and refocusing means with respect to said lines, said housings having substantially uniform thickness within said limits.

11. Wave translation apparatus according to claim 10 in which the housings are disposed inwardly from a cylindrically curved shape beyond the limits of the respective angles.

12. Wave translation apparatus according to claim 10 in which the housings are shaped to confine the modulating materials subtsantially within the limits of the aforesaid respective angles.

13. Wave translation apparatus including a target having a first plurality of regions capable of a first response to radiant wave energy and having a second plurality of regions capable of a second response to radiant wave energy, a first polarizing filter having a first plane of polarization, a first cylindrically curved focusing device in cascade with said first polarizing filter, said first focusing device having a first focal line, a first multiple-segment polarization modulator disposed along said first focal line, said first modulator including an isotropic housing and modulating material, said first modulator housing having cylindrically curved sectors adapted to intercept radiant energy from said first focusing device and having sectors adapted to minimize the amount of said first modulator modulating material not intercepting said beam, a first plurality of means for applying signals to segments of said first modulator, a second polarizing filter cascaded after said first modulator, said second polarizing filter having a second plane of polarization orthogonal to said first plane, a second cylindrically curved focusing device in cascade with said second polarizing filter, said second focusing device having a second focal line, a second multiple-segment polarization modulator disposed along said second focal line, said second modulator including an isotropic housing and modulating material, said second modulator housing having cylindrically curved sectors adapted to intercept energy from said second focusing device and having sectors adapted to minimize the amount of second modulator modulating material not intercepting said beam, a second plurality of means for applying signals to segments of said second modulator, and a third polarizing filter cascaded after said second modulator, said third polarizing filter having a plane of polarization orthogonal to said second plane.

References Cited by the Examiner

UNITED STATES PATENTS

| | | | |
|---|---|---|---|
| 2,441,810 | 5/48 | Glover | 316—20 |
| 2,882,117 | 4/59 | Bruining | 316—20 |
| 3,035,491 | 5/62 | Rosenthal | 88—61 |
| 3,072,889 | 1/63 | Willcox | 340—173 |
| 3,084,334 | 4/63 | Martin | 340—173 |
| 3,098,112 | 7/63 | Horton | 88—61 |

IRVING L. SRAGOW, *Primary Examiner.*